Nov. 29, 1932.  P. M. HALL  1,889,094
TREAD STRUCTURE FOR ANTISKID CHAINS
Filed July 9, 1931
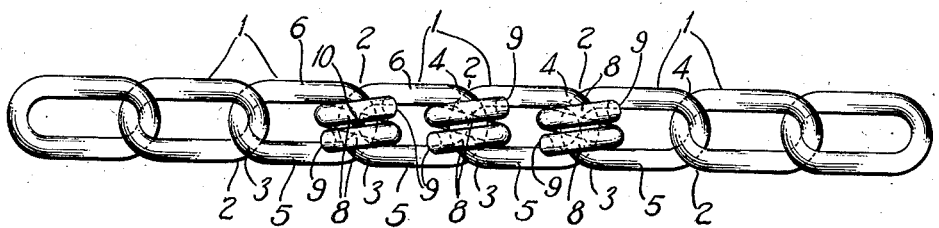
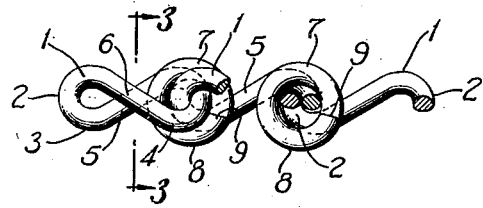
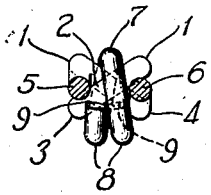
INVENTOR.
PRESTON M. HALL
ATTORNEY Patented Nov. 29, 1932

1,889,094

UNITED STATES PATENT OFFICE

PRESTON M. HALL, OF WORCESTER, MASSACHUSETTS, ASSIGNOR TO AMERICAN CHAIN COMPANY, INC., A CORPORATION OF NEW YORK

TREAD STRUCTURE FOR ANTISKID CHAINS

Application filed July 9, 1931. Serial No. 549,727.

This invention relates to anti-skid devices for vehicle wheels and more particularly to tire-chains of the type comprising cross chains composed of connected open wire links, and is of special utility when embodied in the structure of cross chains composed of open wire links each of which is twisted to form end loops disposed at an angle relatively to each other, having salient portions adjacent to the regions of articulation of neighboring links, although the invention may be embodied in cross chains formed of connected open links of forms other than the twisted type above described, which is commonly known as "curb chain."

An object of the invention is to provide such cross chains with reinforcements presented in position for contact with the road surface, the reinforcements being of an improved form adapted to increase the tractive efficiency of the cross chains, both when power is applied to the wheels to drive the same, and when the brakes are applied to stop the vehicle or diminish its speed; and also to increase the ability of the chains to prevent lateral skidding movement of the wheels.

Another object of the invention is to provide reinforcements of a sturdy but inexpensive character, easily applied, and designed to sustain the wear of road-contact to such an extent as to increase the life of the tire chain as compared with that of many of the existing forms of reinforced chains.

The above and other features of the invention are illustrated and described fully in the accompanying drawing and specification, and are pointed out in the claims.

In the drawing,

Fig. 1 is a plan view of a cross chain adapted to be connected to the side chains conventionally employed in the fabrication of tire chains, the cross chain shown being constructed in accordance with the present invention.

Fig. 2 is a fragmentary detail view in vertical section taken on the medial longitudinal line of Fig. 1, and shows several of the links with their reinforcement members.

Fig. 3 is a vertical section on the line 3—3 of Fig. 2.

In a now-preferred embodiment of the invention selected for illustration and description, the parts designated by the reference numerals 1 respectively are open links formed of wire and twisted to form end-loops 2 disposed at an angle to each other, having salient portions 3 and 4 at either side of the longitudinal axis of the chain and connected by strand portions 5 and 6 oppositely inclined relatively to the plane of road contact, on either side of the longitudinal axis of the above described structure, being of conventional or suitable form, metal and size for the intended purpose.

In pursuance of the invention, a desirable number of the component links, usually two or more of those links which are to be presented in position for engagement with the road surface, are provided with separately formed metal reinforcement members 7 which are preferably characterized by a helical shape and are coiled around the articulated end loops of neighboring links, each reinforcement member comprising more than one complete coil.

The helical members are preferably arranged with their central axes substantially at right angles to the mean longitudinal axis of the cross chain, and their coils are disposed in a position normal to the plane of road contact, and extend at their outer margins 8 beyond the salient portions 3 and 4 sufficiently to sustain the greater part of the wear resulting from contact of the cross chain with the road surface. They may desirably have the free ends 9 of their coils spaced apart peripherally at a distance of about 180 degrees as illustrated, so that each end presents a flat face adapted to engage the adjacent strand portion 5 or 6 as the case may be, serving to prevent rotation of the helical members, so that the double coil portion 8 of each reinforcement member is maintained in its proper position for road contact, thus affording maximum tractive efficiency, and anti-skidding effect, as well as resistance to wear.

The coils may be more or less closely associated as found suitable for particular applications of the invention, and if desired they may be united metallically, as for example by a weld, such as is indicated at 10 in the instance of the helical reinforcement coil which is shown at the left-hand end of the series illustrated in Fig. 1.

The helical members may be formed advantageously of round wire stock similar to that of the links, or of wire stock of any suitable cross-section, and if desired may be made of harder metal, or may have hardened areas at their road contacting portions.

The helical members are shown as having coils of circular form, but a truly circular shape is not essential to their operation in accordance with the invention, and coils of other shapes may be used as found suitable and desirable for the intended purpose.

Other modifications may be adopted to meet the requirements of particular installations.

Cross chains of this novel construction exhibit a very considerable increase in efficiency over conventional types of reinforced anti-skid tire chains.

I claim:

1. An anti-skid chain for vehicle wheels comprising cross chains composed of connected open links and reinforcement members each comprising a piece of wire coiled helically through the openings and around the articulated ends of two adjacent links, each of said helical reinforcements comprising more than one coil, said helical enlargements being held against rotation around said articulated ends of the connected links by the engagement of the free ends of said coils with the strands of said links.

2. An anti-skid chain for vehicle wheels comprising cross chains composed of connected open links and reinforcement members each comprising a piece of wire coiled helically through the openings and around the articulated ends of two adjacent links, each of said helical reinforcements comprising more than one coil and said coils terminating in faces disposed transversely to the longitudinal axis of the wire, and adapted to engage the strands of said links and thereby maintain a double coil portion in position for road contact.

In testimony whereof, I have signed this specification.

PRESTON M. HALL.